June 11, 1968 F. R. HOLYCROSS 3,387,816

DIVERTER SPOUT

Filed Nov. 19, 1965 2 Sheets-Sheet 1

INVENTOR
FRANK R. HOLYCROSS

BY Rows, Birch, Swindler & McKie
ATTORNEYS.

June 11, 1968

F. R. HOLYCROSS 3,387,816

DIVERTER SPOUT

Filed Nov. 19, 1965

INVENTOR
FRANK R. HOLYCROSS
BY Irons, Birch, Swindler & McKie
ATTORNEYS.

United States Patent Office 3,387,816
Patented June 11, 1968

3,387,816
DIVERTER SPOUT
Frank R. Holycross, Marysville, Ohio, assignor to Wallace-Murray Corporation, Pittsburgh, Pa., a corporation of Delaware
Filed Nov. 19, 1965, Ser. No. 508,671
8 Claims. (Cl. 251—175)

This invention relates to the valve art and, more particularly, to a diverter valve for use in connection with a liquid spout such as a bath tub spout wherein the diverter valve is employed to divert liquid from the spout to an additional outlet such as a shower head or other plumbing fixture.

Diverter valves have heretofore commonly been employed in association with plumbing fixtures and generally are of the type wherein the valve is positioned upstream from the spout outlet to a bath tub. Such valves depend on the action of the liquid pressure against the front side of the valve closure member to maintain it in closed position and to seal the closure member against the valve seat or portion of the housing upstream from the spout outlet. In such valves, difficulty is often encountered in maintaining the valve in the closed liquid diverting position by the action of the liquid pressure and, in providing an effective seal between the valve closure member and the valve seat therefor.

To overcome the disadvantages of the prior art diverter valves, it is an object of the present invention to provide an improved diverter valve employing a valve closure member at the downstream side of the valve seat having a resilient sealing element which is deformed by the liquid line pressure into sealing engagement with the valve seat.

Another object of the invention is to provide such an improved diverter valve which is manually operable to a closed position whereat it is held by liquid line pressure, but which automatically moves by force of gravity to an open position when the liquid line pressure is cut off.

A further object of the invention is to provide an improved diverter valve which is simple in construction, but which does not require close tolerance fit between the mating valve parts.

A still further object of the invention is to provide an improved diverter valve employing a valve closure element which defines an aperture adjacent one end to permit the passage of liquid therethrough when the valve is in an open position and which is provided with an imperforate section at the other end defining a recess therein for containing a resilient sealing member which is deformed into effective sealing and retaining engagement with the valve housing when the valve is in a closed position.

In general the invention includes a diverter valve comprising a body member having a liquid port therein, a movable closure member for controlling the passage of fluid through said port, a recess formed in said closure member which surrounds said port when said valve is in closed position, an inwardly protruding shoulder extending around the periphery of said recess adjacent the front thesreof, and a sealing ring slidably disposed within said recess, said sealing ring having a ridge extending around its outer periphery whereby application of liquid line pressure through said port when said valve is in closed position urges said ridge of said ring into sealing engagement with said shoulder and deforms said ring into sealing and retaining engagement with the portion of said body member surrounding said port.

The invention having been broadly described, a specific embodiment thereof will now be set forth in detail with reference to the accompanying drawings in which.

Figure 1:
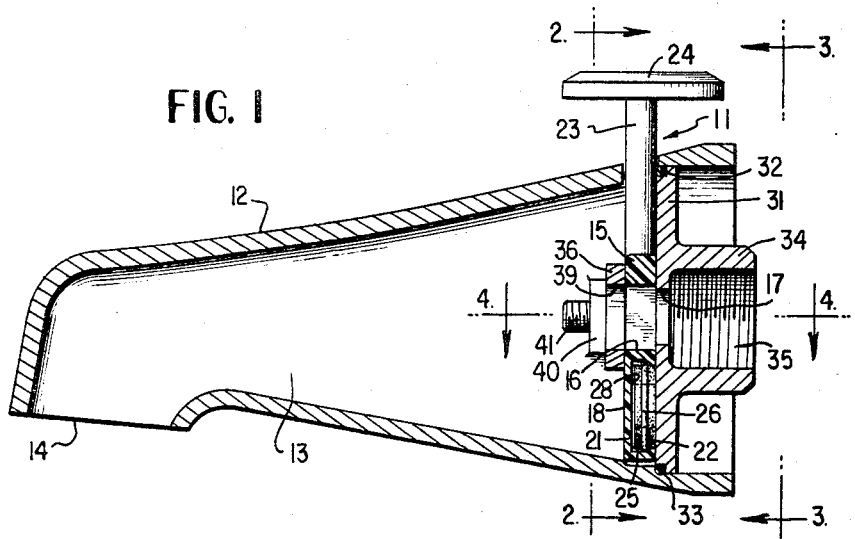
FIGURE 1 is a vertical sectional view of a diverter valve constructed according to the principles of the present invention and associated with a bath tub spout.
Figure 2:
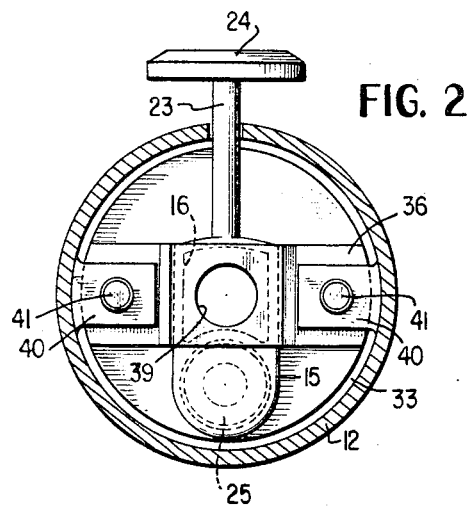
FIGURE 2 is a view taken along line 2—2 of FIGURE 1.
Figure 3:
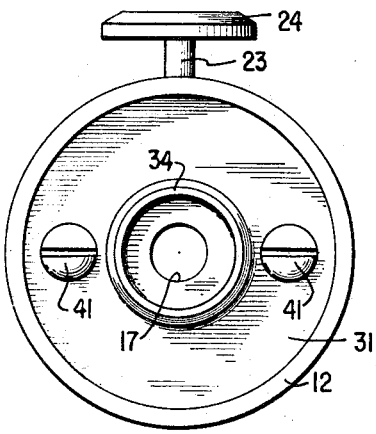
FIGURE 3 is a view taken along line 3—3 of FIGURE 1.
Figure 4:
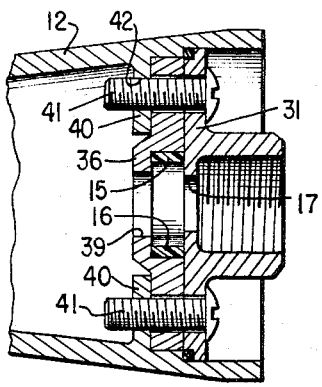
FIGURE 4 is a view taken along line 4—4 of FIGURE 1.
Figure 5:
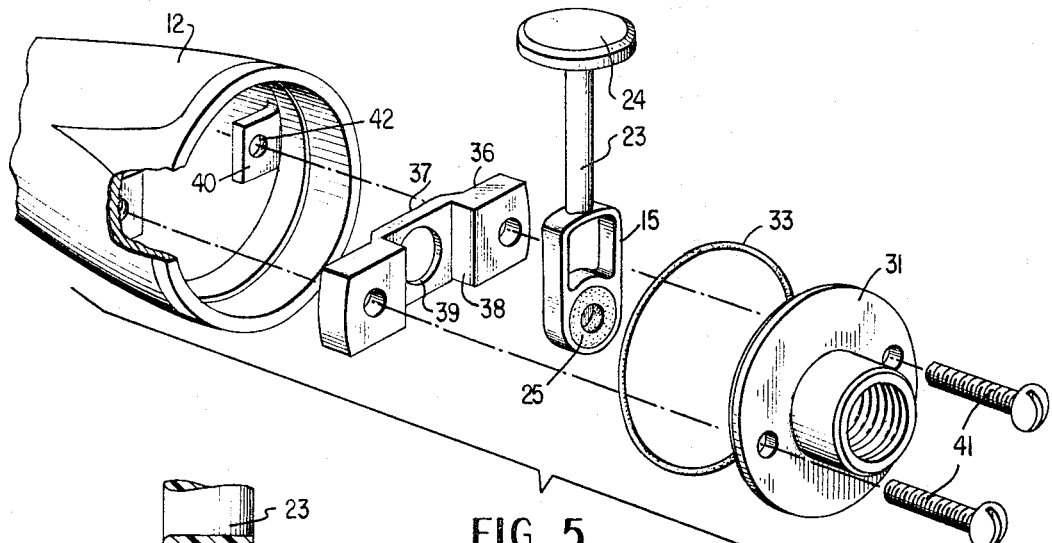
FIGURE 5 is an exploded view of a diverter valve parts shown in perspective.

Illustrated on the drawings in a diverter valve unit, generally indicated by the numeral 11, employed in combination with a suitable liquid spout 12 such as a bath tub spout or a basin spout. The spout 12 is provided with a hollow interior chamber 13 having a discharge outlet 14 at one end thereof with diverter valve unit 11 being mounted at the opposite end.

The diverter valve unit 11 is generally comprised of a valve closure member 15 which defines an aperture 16 adjacent one end thereof to permit fluid to flow therethrough from a valve port 17 when the valve is in an open position as illustrated in FIGURE 1. The valve closure member 15 additionally is provided with an imperforate section 18 adjacent the end opposite the end containing the aperture 16.

Figure 6:
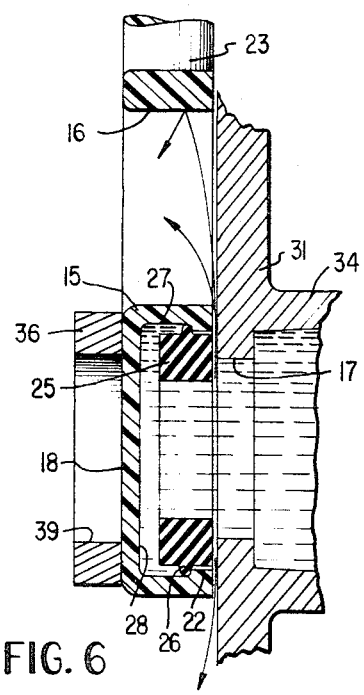
FIGURE 6 is a fragmentary sectional view showing the diverter valve as it is initially moved to closed position but before the sealing member has been deformed into sealing engagement against the portion of the valve housing surrounding the valve port.
Figure 7:
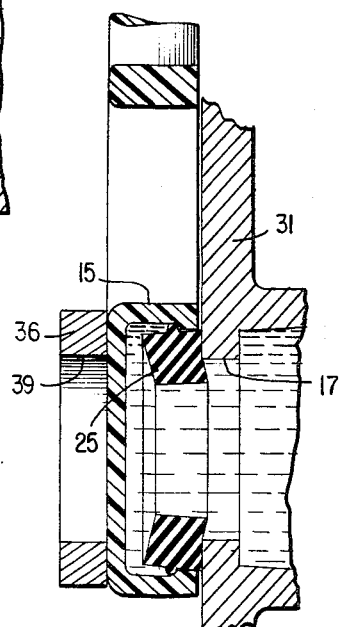
FIGURE 7 is a view similar to FIGURE 6 showing the valve in closed position with the sealing member deformed into sealing and retaining engagement against the portion of the housing surrounding the valve port.
Figure 8:
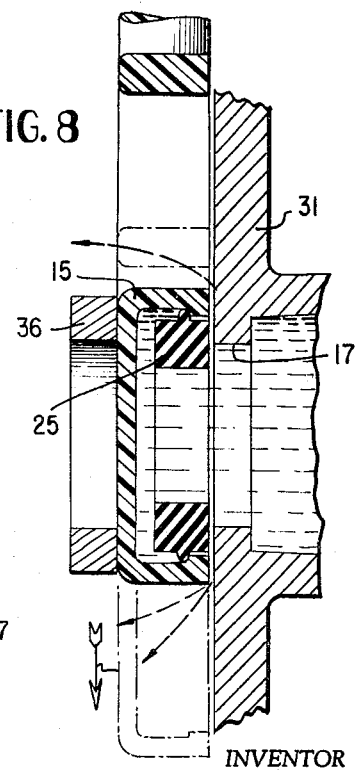
FIGURE 8 is a view similar to FIGURE 6 showing the valve in closed position about to fall to open position just after the liquid line pressure has been cut off.

The imperforate section 18 of closure member 15 has formed therein recess 21 with an inwardly protruding shoulder 22 extending around its periphery adajacent the front thereof, as best shown in FIGURES 6 through 8. Recess 21 has a diameter greater than the diameter of port 17. The closure member 15, may preferably be constructed of a suitable plastic material such as a synthetic resin. A valve operating stem 23 having a knob 24 is connected to the upper portion of closure member 15 to provide means for manually raising the valve to a closed position. The stem 23 may be constructed integral with and of the same material as the closure member 15.

A sealing member, such as resilient sealing ring 25, is mounted for sliding axial movement within the recess 21 of valve closure member 15. Sealing ring 25 has an outer diameter greater than the diameter of port 17 and an inner diameter less than the diameter of port 17. Further, sealing ring 25 is provided with a ridge 26 extending around its outer periphery which loosely contacts the side wall 27 of the recess 21. It is to be noted that the sealing ring 25 is free for axial sliding movement between shoulder 22 and back wall 28 of the recess 21. The ridge 26 of the sealing ring 25 contacts the shoulder 22 of the recess 21 when the sealing ring is in its forward position away from the back wall 28 of the recess to restrain the sealing ring from being forced out of the recess. The sealing ring 25 preferably is constructed of a resilient rubbery material such as buna-N.

In the embodiment of the invention shown in the drawings wherein the diverter valve is employed in conjunction with a spout 12, a valve holder 31 is provided at the valve end of the spout to close the end of the spout and serve as a seat for valve closure member 15. Holder 31 is provided with a notch 32 on its outer periphery to receive a sealing ring 33 which forms a seal with the inner wall of the spout 12. The holder 31 provides the centrally located port 17 to permit liquid to flow therethrough from any suitable source connected to the holder by means of integral boss 34 on its outside face. Boss 34 surrounds port 17 and has an internally threaded bore 35 for attachment to the source of liquid pressure. Although the diverter valve unit 11 is illustrated on the drawings as being combined with a spout 12, it will be understood that the diverter valve may be constructed as a separate valve unit to be usable with conventional bath tub spout or in applications not associated with a spout.

A bracket member 36 is mounted on the inside face of holder 31 to retain the closure member 15 adjacent the holder but not in tight engagement therewith. Bracket member 36 is provided with an offset central portion 37 defining a central slot 38 to slidably receive the closure member 15. Central portion 37 further is provided with an aperture 39 to permit fluid to flow therethrough into the chamber 13 of spout 12 when the valve is in an open position. Bracket member 36 is attached to holder 31 by screws 41 extending through aligned holes in bracket member 36, housing member 31, and lugs 40 attached to the inside of the spout. These lugs 40 have threaded holes 42 to receive screws 41.

In operation of the diverter valve 11 of the present invention, the valve normally is in an open position as shown in FIGURE 1 wherein liquid may flow through port 17 and apertures 16 and 39 into the chamber 13 and out through the discharge outlet 14 of the spout 12 when the liquid line pressure is turned on. The valve 11 may then be moved to a closed position as shown in FIGURES 6 through 8 by manually lifting valve stem knob 24 to pull the valve closure member into closed position. It is to be noted that when the valve is in the closed position, the recess 21 and consequently sealing ring 25 are positioned in direct alignment with port 17.

When the valve closure member 15 is initially moved to the closed position as shown in FIGURE 6, the liquid flowing through port 17 diverts radially to escape into chamber 13 of the spout 12 around the edges of the imperforate section 18 of the valve closure member as indicated by the arrows on FIGURE 6. The liquid escapes around the edges of the imperforate member due to the fact that the valve closure member 15 is not in tight engagement with holder 31 but is urged by liquid pressure against bracket member 36. The radial escape of the liquid around the edges of imperforate section 15 through the restricted space between member 15 and holder 31 create a venturi effect causing a lower pressure to exist at this point of liquid escape. Consequently, the sealing ring 25 is readily deformed into sealing engagement with the portion of the holder 31 surrounding port 17 by this lowered pressure as well as by the application of the liquid line pressure passing through the sealing ring 25 to act against the back face thereof as shown in FIGURE 7. Thus, the liquid line pressure is effectively employed to press and distort the sealing ring into sealing and retaining engagement even though the valve closure member containing the sealing ring is located on the downstream side of liquid flow.

It is to be noted that when the sealing ring 25 is in sealing position, as shown in FIGURE 7, it is restrained from being forced out of the recess 21 by engagement of the ridge 26 of the sealing ring with the shoulder 22 of the recess. Also in the distorted condition created by the liquid line pressure, not only frictional engagement with holder 31, but also distortion of seal 25 into port 17 assures retention of the diverter valve closed.

When the fluid line pressure is cut off, the sealing ring, because of its resilient nature and the holding action of ridge 26 against shoulder 22, snaps back into its original position, as shown in FIGURE 8. The valve closure member 15 is then free to drop by gravity to its normally open position. It is important to note that the ring 25 draws completely back into recess 21 by reason of the relationship of ridge 26 to shoulder 22. Preferably the knob 24 is constructed of sufficient weight to facilitate the downward movement of closure member 31.

It is apparent that the diverter valve of the present invention affords many advantages. The incorporation of a sealing ring which is axially movable in a recess in a valve closure member located on the downstream side enables the sealing ring not only to provide an effective seal but also to retain the valve closure member in closed position under the action of liquid line pressure. Further, the use of the axially movable sealing ring enables the use of a valve construction wherein the valve closure member and the cooperating valve housing member are not maintained in close sliding contact. Thus the only part of the valve which suffers any wear is the sealing ring which is capable of easy replacement. This construction further eliminates the necessity of providing mating valve elements having closely machined tolerances.

While the invention has been described with particular reference to specific embodiments, many other modifications may be made by persons skilled in the art without departing from the scope of the invention which is defined solely by the appended claims.

What is claimed is:
1. A diverter valve comprising
a valve body member having a fluid port therein,
a movable closure member for controlling the passage of fluid through said port,
a recess formed in said closure member which surrounds said port when said valve is in closed position,
an inwardly protruding shoulder extending around the periphery of said recess adjacent the front thereof,
and a sealing ring slidably disposed within said recess having a ridge extending around its outer periphery engageable with said shoulder to retain said ring in said recess, flow of line pressure through said port when said valve is in said closed position acting to urge said ridge of said ring into engagement with said shoulder and deforming said ring into sealing and retaining engagement with the portion of said valve body member surrounding said port.

2. A diverter valve as defined in claim 1 wherein said sealing ring has an inner diameter less than the diameter of said port and an outer diameter greater than the diameter of said port.

3. A diverter valve as defined in claim 1 wherein said closure member has wall means defining an aperture adjacent one end to permit liquid to flow therethrough from said port when said valve is in an open position.

4. A diverter valve comprising
a valve body member having a fluid port therein,
a movable closure member for controlling the passage of fluid through said port, said closure member having wall means defining an aperture adjacent one end thereof to permit fluid to flow therethrough from said port when said valve is in an open position,
a recess formed in said closure member which surrounds said port when said valve is in closed position,
an inwardly protruding shoulder extending around the periphery of said recess adjacent the front thereof,
a valve stem connected to said closure member and extending outwardly to the exterior of said valve body member to be manually grasped to actuate said valve,
and a resilient sealing ring slidably disposed within said recess having a ridge extending around its outer periphery engageable with said shoulder to retain said ring in said recess, flow of line pressure through said port when said valve is in said closed position acting to urge said ridge of said ring into engagement with said shoulder and deforming said ring into sealing and retaining engagement with the portion of said body member surrounding said port.

5. A diverter valve as defined in claim 4 wherein said closure member is comprised of a plastic material.

6. A diverter valve as defined in claim 4 which includes bracket means attached to the portion of said valve body member surrounding said port to loosely retain said closure member against the port forming portion of said member.

7. A diverter valve as defined in claim 4 wherein said valve body member is formed with a tub spout down stream from said movable closure member and said valve stem extends through the top wall of said spout.

8. A diverter valve comprising
 a valve body member having a fluid port therein,
 a movable closure member for controlling the passage of fluid through said port, said closure member having wall means defining an aperture adjacent one end thereof to permit fluid to flow therethrough from said port when said valve is in an open position,
 a recess formed in said closure member which surrounds said port when said valve is in closed position,
 an inwardly protruding shoulder extending around the periphery of said recess adjacent the front thereof,
 a valve stem connected to said closure member and extending outwardly to the exterior of said valve body member to be manually grasped to actuate said valve,
 bracket means attached to the portion of said body member surrounding said port to loosely retain said closure member against the port forming portion of said body member,
 a resilient sealing ring slidably disposed within said recess having an inner diameter less than the diameter of said port and an outer diameter greater than the diameter of said port, said sealing ring having a ridge extending around its outer periphery engageable with said shoulder to retain said ring in said recess, flow of line pressure through said port when said valve is in said closed position acting to urge said ridge of said ring into engagement with said shoulder and deforming said ring into sealing and retaining engagement with the portion of said body member surrounding said port.

References Cited
UNITED STATES PATENTS

| | | | |
|---|---|---|---|
| 2,673,572 | 3/1954 | Hartmann et al. | 251—326 X |
| 2,997,058 | 8/1961 | Hall | 137—360 |
| 3,012,251 | 12/1961 | Fife | 137—597 X |
| 3,043,554 | 7/1962 | Garza | 251—175 |

WILLIAM F. O'DEA, *Primary Examiner.*

D. J. ZOBKIW, *Assistant Examiner.*